Sept. 4, 1951   J. P. REINHARDT   2,566,853
CASTER
Filed April 4, 1947   2 Sheets-Sheet 1

Inventor
John P. Reinhardt
Attorney

Sept. 4, 1951 J. P. REINHARDT 2,566,853
CASTER
Filed April 4, 1947 2 Sheets-Sheet 2
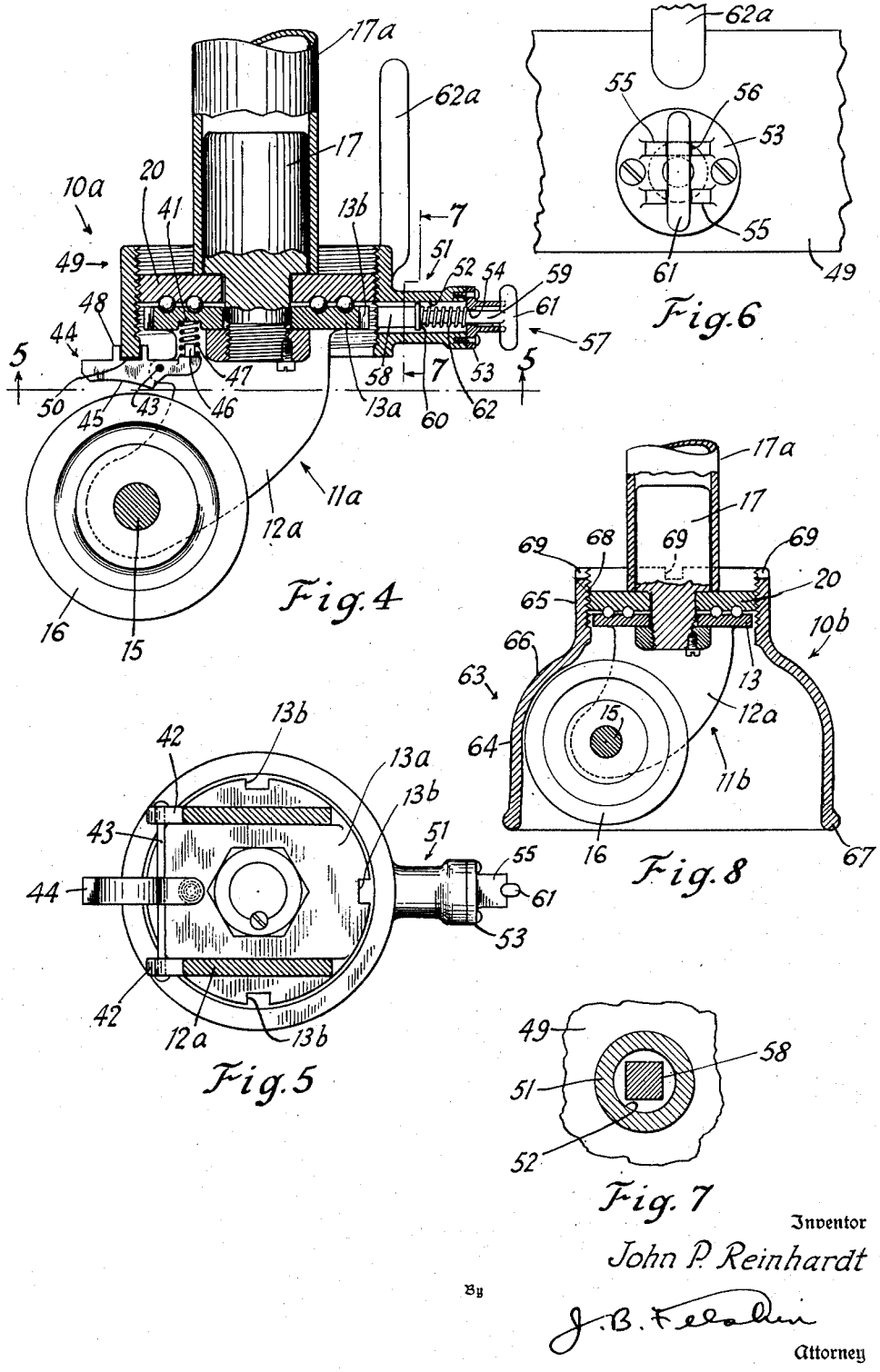
Inventor
John P. Reinhardt
By
J. B. Felshin
Attorney Patented Sept. 4, 1951

2,566,853

UNITED STATES PATENT OFFICE 2,566,853

CASTER

John P. Reinhardt, Brooklyn, N. Y.

Application April 4, 1947, Serial No. 739,441

9 Claims. (Cl. 16—35)

This invention relates to casters of the type which include a brake means therefor.

An object of this invention is to provide a caster structure of the character described comprising improved brake means which is adapted to positively lock the caster wheel and is readily disengaged therefrom.

Another object of this invention is to provide a caster structure of the character described comprising a caster wheel and a rotatable member adapted to move towards and away from the caster wheel whereby said rotatable member constitutes a brake when it is moved towards said caster wheel.

Still a further object of this invention is to provide a caster structure of the character described comprising a shank, a caster wheel swivelly mounted on said shank and a rotatably mounted sleeve on said shank which is adapted upon rotation in one direction to apply a positive braking action on said caster wheel.

Yet another object of this invention is to provide a caster structure of the character described comprising a shank, a caster wheel swivelly mounted on said shank and a rotatable member mounted on said shank, said rotatable member being adapted upon rotation in one direction to contact a base surface and upon continued rotation in the same direction to raise said caster wheel out of contact with said base surface.

Yet a further object of this invention is to provide a strong, durable, and compact caster structure of the character described, which would be relatively inexpensive to manufacture, easy to manipulate, and which is yet practical to a high degree in use.

Other objects of this invention will in part be obvious and part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is an end elevational view of the caster construction embodying the invention;

Fig. 4 is a side elevational view, with parts in section, of a caster construction, embodying the invention and illustrating a modified construction;

Fig. 5 is a cross-sectional view taken on the line 5—5 of Fig. 4;

Fig. 6 is an end view of the operating portion of the swivel locking mechanism shown in Fig. 4;

Fig. 7 is a cross-sectional view taken on the line 7—7 of Fig. 4;

Fig. 8 is a cross-sectional view of a caster construction embodying the invention and illustrating a modified construction.

Figure 3:
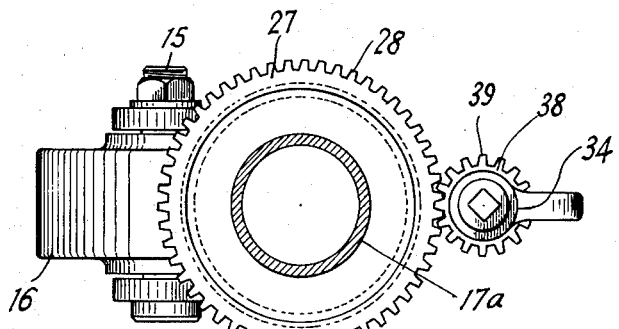
Fig. 3 is a top plan view of the caster construction shown in Fig. 1.

Referring now in detail to the drawing, 10 designates a caster construction embodying the invention. The same comprises a yoke member 11 which comprises a pair of similar parallel legs 12 which are interconnected at their upper ends by a substantially circular horizontal wall 13. The wall 13 is formed with a central opening 14, for the purpose hereinafter appearing. A pin 15 is mounted on the lower end portions of the legs 12 offset with respect to the opening 14 in the wall 13 and a caster wheel 16 is rotatably mounted on the pin between the legs.

A shank 17 which is adapted to be frictionally engaged in an end portion of a structure to be provided with the caster embodying the invention, such as the tubular leg member 17a has a reduced end portion 18 which forms a shoulder 19. A circular disc 20 formed with a central opening 21, is received on the shank 17, lying in contact with the shoulder 19 and secured thereto by a pin 22. The end of the tubular member 17a rests on the upper surface of the disc 20. The end 23 of the reduced portion 18 of the shank 17 is threaded and projects through the opening 14 in the wall 13 and is secured thereto by a nut 24 which may be locked into position by a set screw 25. The circular disc 20 and the circular wall 13 form the upper and lower races for ball bearings 25a. The circular disc 20, which is of slightly larger diameter than the circular wall 13, comprises a screw threaded peripheral portion 26. An internally threaded screw sleeve member 27 is mounted for rotatable engagement with the threaded portion 26 of the disc 20. The outer surface of the sleeve 27 is formed with vertically extending gear teeth 28 for the purpose hereinafter appearing.

Extending outwardly from the legs 12 of the yoke 11 on the other side of the pin 15 are a pair of parallel arms 29 which are interconnected at their ends by a web 30. The web 30 comprises a centrally located enlarged section 31 which is formed with a vertically extending through opening 32. Extending outwardly and upwardly from the enlarged section 31 is a vertical arm 33 having its upper end portion 34 enlarged and turned inwardly in alignment with the enlarged section 31. The end portion 34 is formed with a vertically extending through opening 35 which is aligned with the through opening 32 in the enlarged section 31. A headed pin 36 is rotatably mounted in the through openings 32, 35. The lower end of the pin 36 projecting through the opening 32 in the enlarged section 31 is threaded and a nut 37 is screwed thereon to prevent longitudinal movement of the pin. A pinion gear 38 is secured to a central portion of the pin 36 between the enlarged section 31 and the arm end 34. The teeth 39 on gear 38 engage the teeth 28 on the sleeve 27.

When it is desired to apply a braking action to the caster wheel 16 it is only necessary to rotate the pin 36 by means of a socket or other type of wrench applied to the head of the pin, in a direction which will move the sleeve 27 downwardly towards the caster wheel 16, through the engagement of the pinion gear 38 with the gear teeth on the sleeve 27. Upon continued rotation of the pin 36, the lower end 40, of the sleeve 27 will contact the peripheral surface of the caster wheel 16 and exert a positive braking action thereon. This will also prevent the swivelling action of the caster wheel. Upon rotating the pin 36 in the reverse direction, the sleeve 27 moves upwardly, thereby moving out of contact with the caster wheel and releasing the same for free rotational and swivelling movement.

In Figs. 4, 5, 6 and 7 is shown a caster structure 10a similar to that shown in Figs. 1, 2 and 3 except as noted below and illustrating a modified construction. The same comprises a yoke member 11a which comprises legs 12a on which is mounted a pin 15 for rotatably receiving the caster wheel 16, as previously described. The legs 12a are interconnected at their upper ends by a circular wall member 13a which is formed with a series of rectangular open ended slots 13b on the periphery thereof for the purpose hereinafter described. The number of slots as well as their circumferential disposition may be varied. For the purpose of illustration, four slots disposed at 90 degree intervals, is shown. The circular wall member 13a is further formed with a recess 41 on its under side which is disposed between the legs 12a. The legs 12a of the yoke 11a comprise a pair of apertured lugs 42 disposed below the circular wall 13a in spaced relation thereto and above the caster wheel 16. A pivot pin 43 is mounted on the lugs 42 and a pivoted brake shoe 44 is secured on the pin. The brake shoe 44 comprises an arcuate under surface 45 on one side of the pivot pin 43, which is complementary to the periphery of the caster wheel 16 and is disposed over the same. Extending from the upper surface of the brake shoe 44 is an upstanding pin 46 disposed on the other side of the pivot pin 43 and aligned with the recess 41 in the circular wall member 13a. A coil spring 47 is interposed between the brake shoe 44 and the circular wall member 13a being positioned on the pin 46 and in the recess 41. The brake shoe 44 further comprises a pair of spaced, upstanding guide lugs 48 extending from the upper surface thereof, opposite the curved undersurface 45, for the purpose hereinafter described.

An internally threaded sleeve 49 is rotatably mounted on the externally threaded disc 20. The sleeve 49 comprises a lower edge 50 which is adapted to be received between the guide lugs 48 on the brake shoe 44 when the sleeve approaches the brake shoe upon its downward movement. The sleeve 49 further comprises a radially extending horizontal extension 51 thereof. The extension 51 is formed with a bore 52 which opens on the internal threaded wall portion of the sleeve 49. The outer end of the extension 51 has screwed thereto a closure 53 formed with an opening 54 in the base portion thereof aligned with the bore 52 in the extension. The closure 53 comprises a pair of parallel lugs 55 projecting from the base portion thereof and disposed on opposite sides of the opening 54. The outer ends of the lugs 55 are formed with aligned, shallow recesses 56. A plunger 57 is disposed within the bore 52 of the extension 51 for slidable and rotary movement therein. The plunger 57 comprises an end portion 58 of rectangular cross section which is adapted to be received in engaging relationship with the slots 13b in the circular wall member 13a. The other end of the plunger 57 comprises a stem 59 of circular cross section which forms a shoulder 60 at its juncture with the portion of rectangular cross section 58. The stem 59 projects through the opening 54 in the closure 53 and terminates in a transversely extending handle 61. A coil spring 62 is mounted on the stem 59 and is disposed between the shoulder 60 and the inner side of the closure 53. The handle 61 on the plunger 57, in its normal, retracted disposition, is disposed transversely of the lugs 55, being received in the recesses 56 thereof. In such position, the end of the plunger 57 is disposed inwardly of the threaded inner surface of the sleeve 49. Upon pulling the handle 61 outwardly against the action of the spring 62 and rotating the handle 90 degrees in either direction, the plunger 57 is adapted to be urged inwardly by the spring 62 towards the circular wall 13a. During the inward movement of the plunger the handle 61 passes between the lugs 55. The inward movement of the plunger 57 permits the end portion 58 thereof to project beyond the internally threaded surface of the sleeve 49 into engaging relationship with a slot 13b in the circular wall member 13a, thereby locking it into a predetermined position and preventing rotary movement between the yoke 11a and the sleeve 49. To release the wall 13a for free swivelling action, it is only necessary to pull the handle 61 outwardly, thereby withdrawing the end 58 of the plunger from engagement with the slot 40 in the wall 13a. When the handle 61 is withdrawn sufficiently to clear the lugs 55, the handle 61 is rotated 90 degrees in either direction and the handle is released. The spring 62 will then move the handle 61 into engagement with the recesses 56 in the lugs 55, leaving the end 58 of the plunger in its normal, retracted position.

Means is also provided for facilitating the rotary movement of the sleeve 49. To this end, a handle 62a extends upwardly from the outer surface of the sleeve 49 and is disposed above the base of the extension 51.

Upon rotating the sleeve 49, by the use of the handle 62, in a direction to produce downward movement thereof, the lower edge 50 of the sleeve guided by the lugs 48 engages the upper surface of the brake shoe 44. Upon continued downward movement of the sleeve, the brake shoe 44 is pivoted in a counter-clockwise direction about the pivot pin 43, thereby bringing the arcuate undersurface 45 of the brake shoe into braking contact with the caster wheel 16. Upon reversing the direction of rotation of the sleeve 49, the upward movement of the sleeve will release the brake shoe from contact with the caster wheel, the spring 47 rotating the brake shoe 44 in a clockwise direction about the pivot pin 43 thereby restoring the brake shoe to its normal position out of contact with the caster wheel.

It is apparent that in the foregoing construction, the swivelling action of the caster 10a may be controlled independently of the braking action of caster wheel 16. This permits the movement of a structure equipped with such a construction in a given direction. The brake 44 may then be applied when necessary.

In Fig. 8 is shown a caster construction 10b embodying the invention and illustrating a modified construction. The same comprises a yoke 11b which includes a circular interconnecting top wall 13 which also forms a lower ball bearing race. Opposed thereto the peripherally threaded circular disc 20 mounted on the shank 17, as previously described, forms an upper ball bearing race. The caster construction includes the caster wheel 16 rotatably mounted between the legs 12a of the yoke 11b. The shank 17 interconnects the yoke 11b and the disc 20 in the manner previously described.

Means is provided for simultaneously rendering both the rotatable and swivelling action of the caster wheel 16 ineffective. To this end there is provided a bell shaped walled housing 63 rotatably mounted on the disc 20 and enclosing the caster wheel 16. The housing 63 comprises a lower skirt portion 64 of large diameter connected to a neck portion 65 of relatively smaller diameter by an intermediate inwardly and upwardly curved portion 66. The skirt portion 64 comprises an enlarged beaded peripheral edge 67 which is adapted to contact a base surface over which the caster wheel 16 travels. The wall portions 64 and 66 are of such dimensions as to clear the peripheral portions of the caster wheel 16. The neck portion 65 of the housing is formed with an internally screw threaded surface 68 which engages the peripherally screw threaded portion of the disc 20. The upper edge of the neck portion 65 is formed with circumferentially spaced slots 69 which are adapted to receive the end of a wrench or the like, thereby facilitating the rotational movement of the housing.

It is apparent from a consideration of Fig. 8, the housing 63 may be rotated in a direction to move the housing downwardly towards a base surface. Upon continued downward movement of the housing 63, the lower edge 67 thereof will extend beyond the lower portion of the caster wheel 16 which is in contact with the said base surface. In such a position, the caster wheel 16 will be elevated with respect to and no longer in contact with the base surface. Accordingly, the caster wheel will be ineffectual to either rotate or swivel, thereby fixing the position of the tubular member 17a with respect to the base surface. Upon rotating the housing 63 in the reverse direction, the upward movement thereof will restore the caster wheel 16 to its normal position on the base surface and permit its usual rotating and swivelling action.

Figure 9:
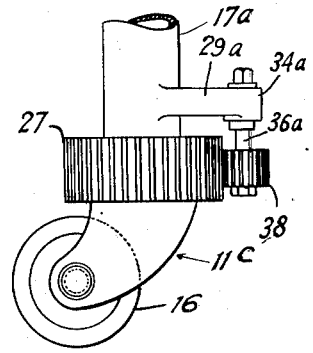
Fig. 9 is a side elevational view of a caster construction embodying the invention and illustrating another modified construction.
Figure 2:
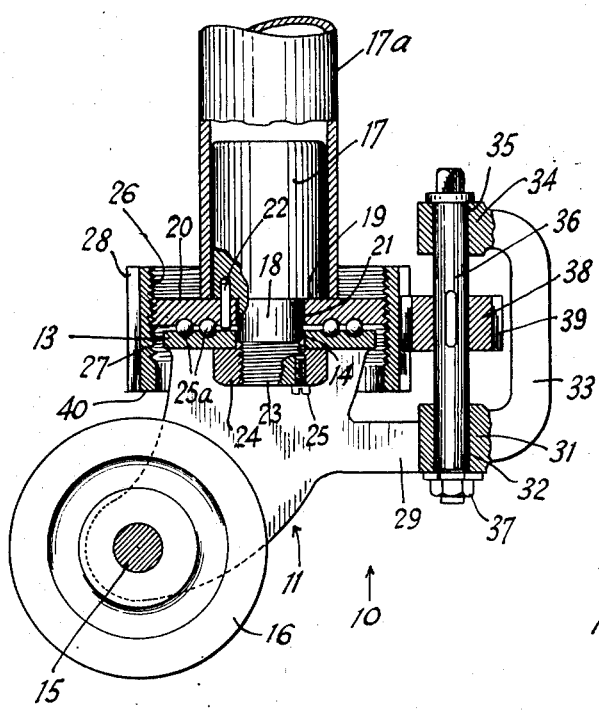
Fig. 2 is a cross-sectional view taken on the line 2—2 of Fig. 1.
Figure 1:
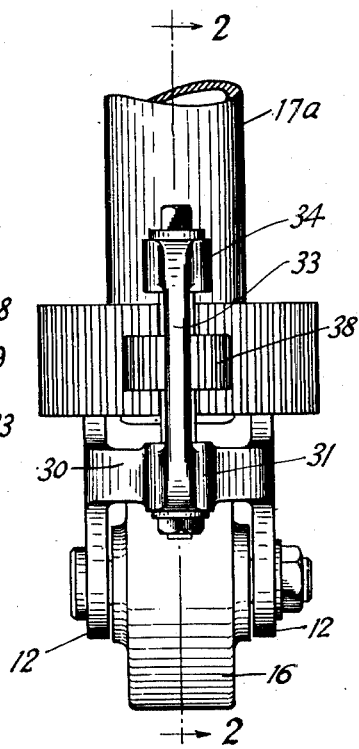

In Fig. 9 is shown a caster construction 11c similar to that illustrated in Figs. 1-3 except that the bracket portions 29, 30, 33 and 34 are replaced by a bracket 29a extending horizontally from a lower portion of the leg member 17a and secured thereto by rivets, welding or the like. The bracket 29a comprises a thickened bearing portion 34a at its outer end, in which is rotatably mounted a headed pin 36a. A collar secured to the pin 36a below the bearing portion 34a prevents longitudinal movement of the pin. A pinion 38, secured to the lower end portion of the pin 36a, meshes with the teeth on sleeve 27. The sleeve 27 is moved towards and away from the caster wheel 16 by the use of a wrench applied to the head of the pin 36a, in the manner previously described.

It will be apparent that the caster construction described above is adapted to brake the wheel member of the construction in a relatively simple manner.

It will thus be seen that there is provided a device in which the several objects of this invention are achieved, and which is well adapted to meet the conditions of practical use.

As various possible embodiments might be made of the above invention, and as various changes might be made in the embodiment above set forth or shown in the accompanying drawing it is to be interpreted as illustrative and not in a limiting sense.

Having thus described my invention I claim as new and desire to secure by Letters Patent:

1. A caster comprising a shank member, a yoke swivelled about the axis of said shank member, a wheel mounted for rotation on said yoke on an axis perpendicular to said axis of said shank member, an annular plate on said shank formed with external screw threads, a sleeve having internal screw threads engaging the threads on said plate, gear teeth on said sleeve, and a pinion meshing with said gear teeth said sleeve being adapted to press against said wheel upon turning said sleeve in one direction.

2. A caster comprising a shank member, a yoke swivelly mounted on the axis of said shank member, a wheel rotatably mounted on said yoke, an annular plate formed with external screw threads fixed to said shank member, an internally screw threaded sleeve engaging the threads on said annular plate, said sleeve being formed with teeth on the external portions thereof, a bracket on said yoke disposed in spaced relationship to said sleeve, a headed pin rotatably mounted on said bracket with its axis parallel to the axis of said shank member, and a pinion on said pin and engaging the teeth on said sleeve.

3. In combination a member and a caster on said member, said caster comprising a shank member, a yoke swivelly mounted on the axis of said shank member, a wheel rotatably mounted on said yoke, an annular plate formed with external screw threads fixed to said shank member, an internally screw threaded sleeve engaging the threads on said annular plate, means associated with the sleeve to press against the wheel upon turning the sleeve in one direction said sleeve being formed with teeth on the external portions thereof, a bracket on one of said members, a pin rotatably mounted on said bracket with its axis parallel to the axis of the shank member, and a pinion on said pin meshing with the teeth on said sleeve.

4. A caster comprising a shank, a base plate fixed to the shank and having an external diameter greater than the external diameter of the shank and being formed with external screw threads, said base plate being formed with a central opening, a stud on the shank projecting through said opening, a nut screwed to the lower end of the stud, a yoke comprising a top plate formed with a central opening through which said stud passes, said top plate being interposed between the base plate and said nut, said yoke including a pair of offset arms extending downwardly from the top plate, a wheel mounted for rotation between said offset arms on an axis perpendicular to the axis of the shank and offset therefrom, a sleeve having internal screw threads engaging said external screw threads, a portion of said sleeve overlying the top of said wheel whereby rotation of the sleeve in one direction will cause the sleeve to bear against said wheel and brake the wheel, a pin rotatably mounted in transversely spaced relation to said shank, and a pinion carried by pin and meshing with teeth upon the sleeve to rotate the sleeve and shift the sleeve vertically when the pin is turned.

5. A caster comprising a shank adapted to engage within the lower open end of a tube, an annular plate fixed with respect to the shank, said annular plate having external screw threads and of a diameter greater than the shank, a yoke comprising a top plate rotatably mounted about the axis of the shank, arms extending downwardly from the top plate, a wheel rotatably mounted between said arms on an axis perpendicular of the axis of the shank and offset therefrom, a sleeve having internal screw threads engaging said external screw threads of said plate, the sleeve also having external teeth, a portion of said sleeve overlying the top of said wheel whereby rotation of said sleeve in one direction will cause the sleeve to move toward the wheel for frictionally gripping and braking the same, and rotation of said sleeve in an opposite direction will cause the sleeve to move upwardly away from said wheel, and actuating means for said sleeve including a rotatable pinion meshing with the teeth of the sleeve.

6. A caster comprising a shank, a base plate fixed to the shank and having an external diameter greater than the external diameter of the shank and being formed with external screw threads, said base plate being formed with a central opening, a stud on the shank projecting through said opening, a yoke comprising a top plate formed with a central opening through which said stud rotatably passes, said yoke including a pair of offset arms extending downwardly from the top plate, a wheel mounted for rotation between said offset arms on an axis perpendicular to the axis of the shank and offset therefrom, a sleeve having internal screw threads engaging said external screw threads, means on the arms for rotating said sleeve including a rotatably mounted vertically disposed pin and a gear meshing with teeth about the sleeve, a portion of said sleeve overlying the top of said wheel whereby rotation of the sleeve in one direction to move it towards the wheel will cause the sleeve to apply gripping pressure against said wheel to brake the wheel.

7. A caster comprising a shank adapted to engage within the lower open end of a tube, an annular plate fixed with respect to the shank, said annular plate having external screw threads and being of a diameter greater than the shank, a yoke comprising a top plate rotatably mounted about the axis of the shank, arms extending downwardly from the top plate, a wheel rotatably mounted between said arms on an axis perpendicular of the axis of the shank and offset therefrom, a sleeve having internal screw threads engaging said external screw threads, a portion of said sleeve overlying the top of said wheel, means on the sleeve for rotating said sleeve, whereby rotation of said sleeve in one direction will cause the sleeve to move toward the wheel for applying braking pressure to the same and rotation of said sleeve in an opposite direction will cause the sleeve to move upwardly away from said wheel for relieving said braking pressure.

8. The structure of claim 7 wherein the top plate carries a brake shoe normally disposed out of contact with the wheel and moves into gripping engagement with the wheel when the sleeve is moved towards the wheel.

9. The structure of claim 7 wherein the top plate carries a brake shoe pivotally mounted for vertical tilting movement towards and away from the wheel, said shoe being normally disposed out of engagement with the wheel and having a portion extending under the sleeve in position adapting the shoe to be engaged by the sleeve and tilted downwardly into gripping engagement with the wheel when the sleeve is moved downwardly to a pressure applying position.

JOHN P. REINHARDT.

REFERENCES CITED

The following references are of record in the file of this patent:

UNITED STATES PATENTS

| Number | Name | Date |
|---|---|---|
| 664,798 | Weidman | Dec. 25, 1900 |
| 1,068,485 | Davidson | July 29, 1913 |
| 1,076,778 | Medart | Oct. 28, 1913 |
| 1,671,774 | McIntosh | May 29, 1928 |
| 1,810,971 | Lee | June 23, 1931 |
| 1,973,098 | Pride | Sept. 11, 1934 |
| 2,110,227 | Koenigkramer et al. | Mar. 8, 1938 |
| 2,188,648 | Bouvier et al. | Jan. 30, 1940 |

FOREIGN PATENTS

| Number | Country | Date |
|---|---|---|
| 390 | Great Britain | of 1901 |
| 234,265 | Germany | July 1, 1910 |